US010210111B2

(12) United States Patent
Chaiken et al.

(10) Patent No.: US 10,210,111 B2
(45) Date of Patent: Feb. 19, 2019

(54) SYSTEMS AND METHODS FOR MINIMIZING AUDIO GLITCHES WHEN INCURRING SYSTEM MANAGEMENT INTERRUPT LATENCY

(71) Applicant: Dell Products L.P., Round Rock, TX (US)

(72) Inventors: Craig Lawrence Chaiken, Pflugerville, TX (US); Vinod Makhija, Austin, TX (US); Balasingh Ponraj Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/483,205

(22) Filed: Apr. 10, 2017

(65) Prior Publication Data

US 2018/0293194 A1 Oct. 11, 2018

(51) Int. Cl.
*G06F 3/16* (2006.01)
*G06F 13/24* (2006.01)
*G06F 17/00* (2006.01)

(52) U.S. Cl.
CPC .............. *G06F 13/24* (2013.01); *G06F 3/162* (2013.01); *G06F 3/165* (2013.01)

(58) Field of Classification Search
CPC . G06F 13/24; G06F 13/26; G06F 3/16; G06F 3/162; G06F 3/165; G06F 3/167; G06F 2213/2406; G06F 9/48; G06F 9/268; G06F 9/327; G06F 9/4812; G06F 9/4818; G06F 9/4825; G06F 9/4831
See application file for complete search history.

(56) References Cited

U.S. PATENT DOCUMENTS

| 6,208,932 | B1 * | 3/2001 | Ohmura | G01C 21/365 340/988 |
| 7,010,370 | B1 * | 3/2006 | Riegelsberger | G10L 19/00 381/63 |
| 2002/0120802 | A1 * | 8/2002 | Knudsen | G06F 13/24 710/260 |
| 2004/0165486 | A1 * | 8/2004 | Ueki | G11B 7/0079 369/30.23 |
| 2008/0032663 | A1 * | 2/2008 | Doyle | H04H 20/106 455/345 |
| 2011/0066264 | A1 * | 3/2011 | Cho | G11B 20/10527 700/94 |

(Continued)

*Primary Examiner* — Andrew C Flanders
(74) *Attorney, Agent, or Firm* — Jackson Walker L.L.P.

(57) ABSTRACT

In accordance with these and other embodiments of the present disclosure, a method may include determining whether a system management interrupt is expected to take more than a predetermined threshold duration to complete, determining whether audio data is actively streaming from a processor of an information handling system to an audio controller communicatively coupled to the processor and configured to process audio data communicated from the processor to the audio controller for reproduction to a speaker communicatively coupled to the audio controller, and executing the system management interrupt if the system management interrupt is expected to take less than a predetermined threshold duration to complete or if audio data is not actively streaming from the processor to the audio controller.

14 Claims, 3 Drawing Sheets

(56) References Cited

U.S. PATENT DOCUMENTS

| | | | | |
|---|---|---|---|---|
| 2011/0118861 A1* | 5/2011 | Koike | ............... | G10H 1/0058 |
| | | | | 700/94 |
| 2011/0208335 A1* | 8/2011 | Nathan | ............... | G06F 3/04847 |
| | | | | 700/94 |
| 2012/0253491 A1* | 10/2012 | Miyata | ............. | G11B 20/10527 |
| | | | | 700/94 |
| 2015/0194165 A1* | 7/2015 | Faaborg | ............... | G10L 21/00 |
| | | | | 704/270.1 |
| 2015/0363155 A1* | 12/2015 | Hayashi | ............... | G10L 13/02 |
| | | | | 700/94 |

\* cited by examiner

SYSTEMS AND METHODS FOR MINIMIZING AUDIO GLITCHES WHEN INCURRING SYSTEM MANAGEMENT INTERRUPT LATENCY

TECHNICAL FIELD

The present disclosure relates in general to information handling systems, and more particularly to minimizing audio glitches in an information handling system when the information handling system incurs a system management interrupt.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a system management module that executes on an operating system of an information handing system. Such system management module may occasionally issue interrupts, placing the information handling system in a system management mode in which the system management module may collect operational data from components of the information handling system. Typically, when in the system management mode, a processor may not respond to other system interrupts. Thus, if audio is active in a system management mode, a risk exists that the audio subsystem may become data starved, resulting in an audio glitch that may be perceptible to a user.

SUMMARY

In accordance with the teachings of the present disclosure, the disadvantages and problems associated with audio glitches resulting from system management interrupts in an information handling system may be reduced or eliminated.

In accordance with embodiments of the present disclosure, an information handling system may include a processor, an audio controller communicatively coupled to the processor and configured to process audio data communicated from the processor to the audio controller for reproduction to a speaker communicatively coupled to the audio controller, and a program of instructions embodied in non-transitory computer readable media and configured to, when read and executed by the processor, responsive to receipt of a system management interrupt or responsive to the scheduled system management interrupt coming due for execution: (a) determine whether the system management interrupt is expected to take more than a predetermined threshold duration to complete; (b) determine whether audio data is actively streaming from the processor to the audio controller; and (c) execute the system management interrupt if the system management interrupt is expected to take less than a predetermined threshold duration to complete or if audio data is not actively streaming from the processor to the audio controller.

In accordance with these and other embodiments of the present disclosure, a method may include determining whether a system management interrupt is expected to take more than a predetermined threshold duration to complete, determining whether audio data is actively streaming from a processor of an information handling system to an audio controller communicatively coupled to the processor and configured to process audio data communicated from the processor to the audio controller for reproduction to a speaker communicatively coupled to the audio controller, and executing the system management interrupt if the system management interrupt is expected to take less than a predetermined threshold duration to complete or if audio data is not actively streaming from the processor to the audio controller.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (a) determine whether a system management interrupt is expected to take more than a predetermined threshold duration to complete; (b) determine whether audio data is actively streaming from a processor of an information handling system to an audio controller communicatively coupled to the processor and configured to process audio data communicated from the processor to the audio controller for reproduction to a speaker communicatively coupled to the audio controller; and (c) execute the system management interrupt if the system management interrupt is expected to take less than a predetermined threshold duration to complete or if audio data is not actively streaming from the processor to the audio controller.

In accordance with these and other embodiments of the present disclosure, a method may include responsive to an audio request being communicated to an audio driver, intercept the audio request to determine a duration of audio data of the audio request, determining if the duration of the audio data is longer than an expected duration of a system management interrupt, and executing the system management interrupt if the duration of the audio data is longer than the expected duration of the system management interrupt.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
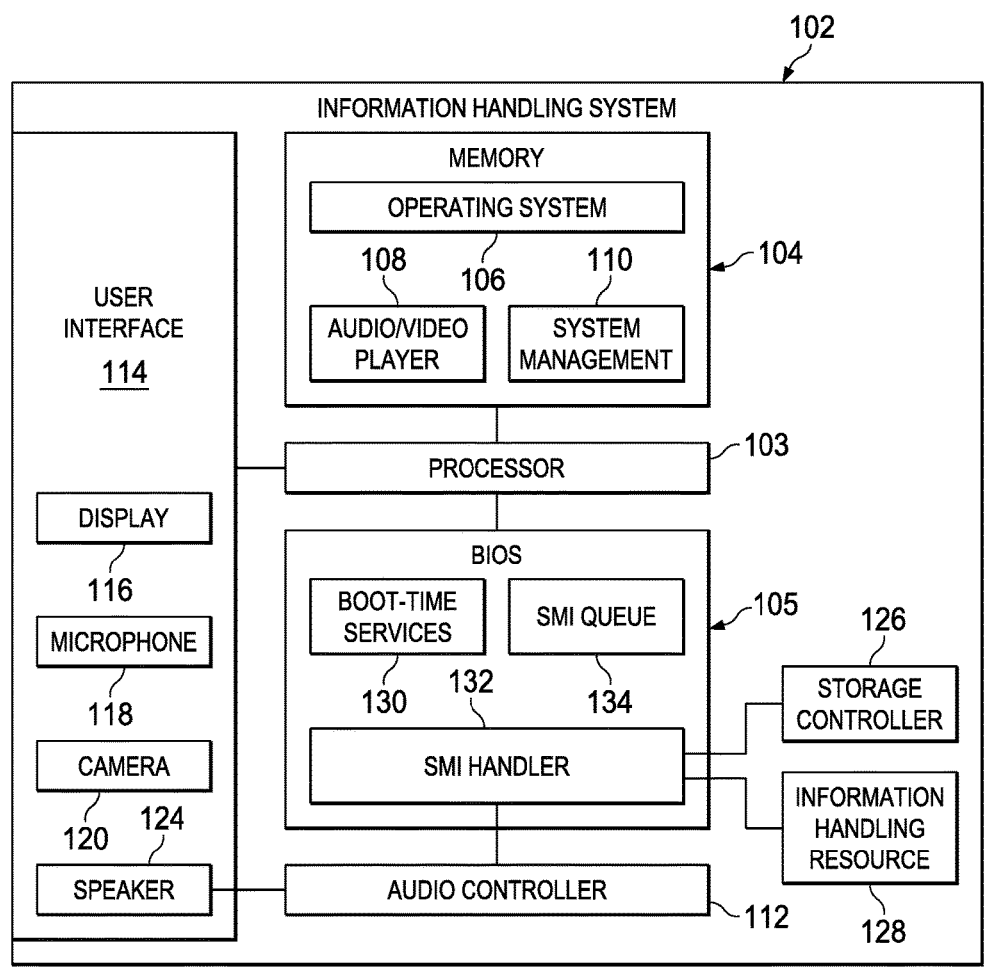
FIG. 1 illustrates a block diagram of selected components of an example information handling system, in accordance with embodiments of the present disclosure.
Figure 2:
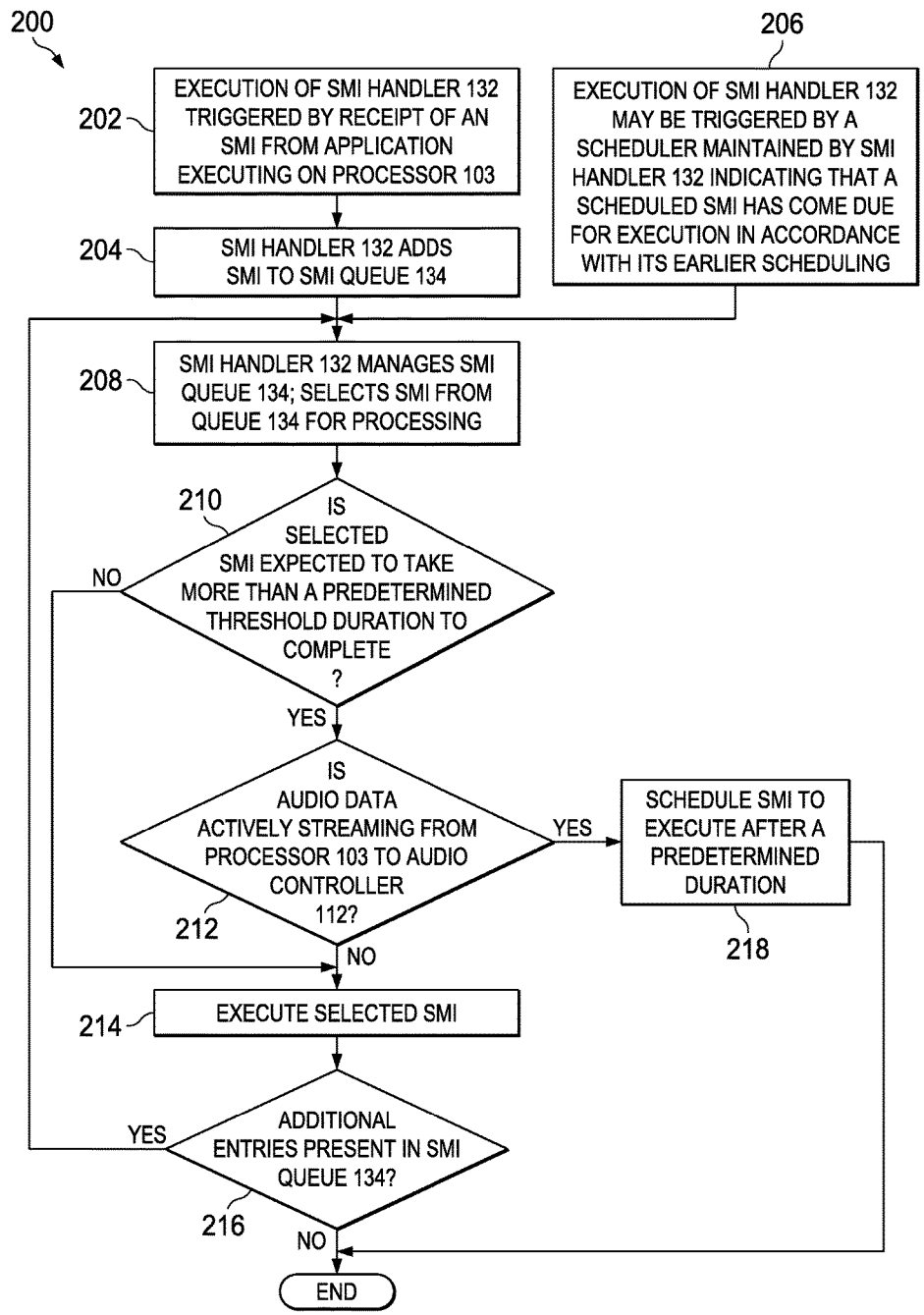
FIG. 2 illustrates a flow chart of an example method for minimizing audio glitches in an information handling system when the information handling system incurs a system management interrupt, in accordance with certain embodiments of the present disclosure.
Figure 3:
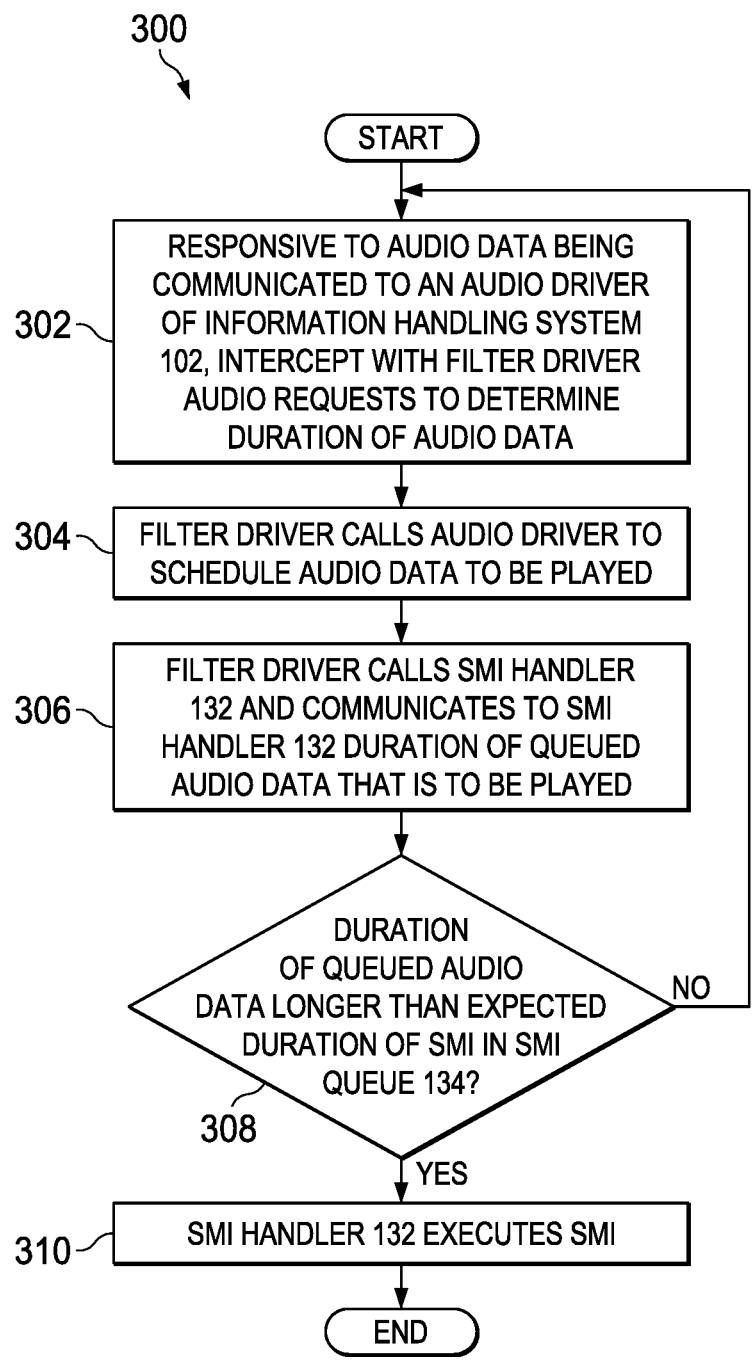
FIG. 3 illustrates a flow chart of another example method for minimizing audio glitches in an information handling system when the information handling system incurs a system management interrupt, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of selected components of an example information handling system 102, in accordance with embodiments of the present disclosure. In some embodiments, information handling system 102 may comprise or be an integral part of a server. In some embodiments, information handling system 102 may be a personal computer (e.g., a desktop computer or a portable computer). In other embodiments, information handling system 102 may comprise a mobile device (e.g., smart phone, a tablet computing device, a handheld computing device, a personal digital assistant, or any other device that may be readily transported on a person of a user of such mobile device).

As depicted in FIG. 1, information handling system 102 may include a processor 103, a memory 104 communicatively coupled to processor 103, an audio controller 112 communicatively coupled to processor 103, a user interface 114 communicatively coupled to processor 103, a storage controller 126 communicatively coupled to processor 103, and an information handling resource 128 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

As shown in FIG. 1, memory 104 may have stored thereon an operating system 106, and audio/video player 108, and system management module 110. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Audio/video player 108 may comprise any program of executable instructions, or aggregation of programs of executable instructions, configured to execute on operating system 106 and having functionality for outputting audio data to be communicated to speaker 124 via audio controller 112.

System management module 110 may comprise any program of executable instructions, or aggregation of programs of executable instructions, configured to execute on operating system 106 and having functionality for gathering telemetry data regarding one or more information handling resources of information handling system 102, from which system management module 110 may generate reports from such telemetry data and/or control operation of one or more information handling resources of information handling system 102 based on such telemetry data.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot-time services 130 configured to be the first code executed by processor 103 when information handling system 102 is booted and/or powered on. As part of its initialization functionality, boot-time services 130 of BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may also include system management interrupt (SMI) handler 132. SMI handler 132 may comprise a program of instructions that may be read by and executed on processor 103 to handle system management interrupts, including interrupt requests received from system management module 110 for system management functions of system management module 110, interrupt requests received from audio/video player 108 and/or operating system 106 for communicating audio data to audio controller 112 for playback on speaker 124, and/or other interrupt requests. SMI handler 132 may also maintain an SMI queue 134 of interrupt requests to be processed by SMI handler 132. Although shown as integral to BIOS 105, SMI queue 134 may be embodied in a memory internal to BIOS 105 or external to but accessible by BIOS 105.

Audio controller 112 may comprise any system, device, or apparatus configured to interface between speaker 124 and processor 103 (including BIOS 105 and operating system 106 executing thereon), in order to process audio data communicated from operating system 106 to audio controller 112 for playback by speaker 124. For example, functionality executed by audio controller 112 may include, without limitation, buffering audio data received from operating system 106, converting audio data in digital format into equivalent analog audio data for playback by speaker 124, and/or any other functionality incident for playing back sound on speaker 124.

User interface 114 may comprise any instrumentality or aggregation of instrumentalities by which a user may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a user (e.g., via a display device, speaker, and/or other data output device). As shown in FIG. 1, user interface 114 may include one or more of a display 116, microphone 118, camera 120, and speaker 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

Camera 120 may comprise any system, device, or apparatus configured to record images (moving or still) into one or more electrical signals that may be processed by processor 103.

Speaker 124 may comprise any system, device, or apparatus configured to produce sound in response to electrical audio signal input.

In addition to processor 103, memory 104, BIOS 105, audio controller 112, user interface 114, and storage controller 126, information handling system 102 may include one or more other information handling resources 128. Such an information handling resource 128 may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Storage controller 126 may comprise any system, device, or apparatus configured to interface between processor 103 (including BIOS 105 and operating system 106 executing thereon), in order to process storage input/output (I/O) data and/or requests communicated from operating system 106 to storage controller 126 for reading data from or writing data to storage resources (not explicitly shown) communicatively coupled to storage controller 126. For example, functionality executed by audio controller 112 may include, without limitation, caching I/O data, performing Redundant Array of Inexpensive Disks (RAID) operations, and/or any other functionality incident to storage I/O.

In operation, and as discussed in greater detail below with respect to FIG. 2, SMI handler 132 may be configured to minimize audio glitches incurred by system management interrupts (SMIs) by deferring SMIs expected to take longer than a predetermined threshold duration (e.g., 1 millisecond) when audio data is streaming from processor 103 to audio controller 112.

FIG. 2 illustrates a flow chart of an example method 200 for minimizing audio glitches in an information handling system when the information handling system incurs a system management interrupt, in accordance with certain embodiments of the present disclosure. According to some embodiments, method 200 may begin at either of step 202 or 206. As noted above, teachings of the present disclosure may be implemented in a variety of configurations of information handling system 102.

At step 202, execution of SMI handler 132 may be triggered by receipt of an SMI from an application (e.g., system management module 110) executing on processor 103. At step 204, in response to the receipt of the SMI, SMI handler 132 may add the SMI to SMI queue 134. After completion of step 204, method 200 may proceed to step 208.

Alternatively, at step 206, execution of SMI handler 132 may be triggered by a scheduler maintained by SMI handler 132 indicating that a scheduled SMI has come due for execution in accordance with its earlier scheduling.

At step 208, responsive to being triggered by receipt of an SMI (step 202) or triggered by a scheduled SMI (step 206), SMI handler 132 may manage SMI queue 134 by deleting duplicate entries, prioritizing entries in SMI queue 134 in accordance with a respective priority assigned to each entry, and then select an SMI from queue 134 for processing.

At step 210, SMI handler 132 may determine if the selected SMI is expected to take more than a predetermined threshold duration (e.g., 1 millisecond) to complete. Such predetermined threshold duration may be selected based on a determination of a maximum allowable time for an audio glitch, such that audio glitches of smaller duration than the predetermined threshold duration may be imperceptible to a listener of speaker 124, while audio glitches of larger duration than the predetermined threshold duration may be perceptible to a listener of speaker 124. If the selected SMI is expected to take more than the predetermined threshold duration, method 200 may proceed to step 212. Otherwise, if the selected SMI is expected to take less than the predetermined threshold duration, method 200 may proceed to step 214.

At step 212, responsive to the selected SMI expected to take more than the predetermined threshold duration, SMI handler 132 may determine if audio data is actively streaming from processor 103 to audio controller 112. If no audio is streaming, any system management interrupt taking place on processor 103 is unlikely to affect audio performance, and method 200 may proceed to step 214. Otherwise, if audio is streaming, a system management interrupt taking place on processor 103 may likely affect audio performance, and method 200 may proceed to step 218.

At step 214, SMI handler 132 may execute the selected SMI. At step 216, SMI handler 132 may determine if additional entries are present in SMI queue 134. If additional entries are present, method 200 may proceed again to step 208. If no further additional entries are present in SMI queue 134, method 200 may end.

At step 218, in response to audio streaming from processor 103 to audio controller 112, SMI handler 132 may schedule the SMI to execute after a pre-determined duration (e.g., 10 milliseconds), such that the audio streaming has a chance to complete prior to execution of the SMI. After completion of step 218, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the foregoing method minimizes audio glitches in embodiments in which audio streaming is detectible, in some embodiments of information handling system 102, detecting of audio streaming may not be possible, such as when the audio solution is embodied in a Universal Serial Bus or other device externally coupled to information handling system 102. However, the approach set forth in method 300, below, and similar methods may address the problem of minimizing audio glitches due to system management interrupts.

FIG. 3 illustrates a flow chart of an example method 300 for minimizing audio glitches in an information handling system when the information handling system incurs a system management interrupt, in accordance with certain embodiments of the present disclosure. According to some embodiments, method 300 may begin at step 302. As noted above, teachings of the present disclosure may be implemented in a variety of configurations of information handling system 102.

At step 302, in response to audio data being communicated to an audio driver (not explicitly shown) of information handling system 102, a filter driver (not explicitly shown) may intercept audio requests to determine a duration of the audio data. Such filter driver may comprise a driver configured to execute on operating system 106.

At step 304, the filter driver may call the audio driver to schedule the audio data to be played. At step 306, the filter driver may call SMI handler 132 and communicate to SMI handler 132 the duration of the queued audio data that is to be played.

At step 308, SMI handler 132 may determine if the duration of the queued audio data is longer than an expected duration of an SMI in SMI queue 134. If the duration of the queued audio data is longer than an expected duration of an SMI in SMI queue 134, method 300 may proceed to step 310. If the duration of the queued audio data is longer than an expected duration of an SMI in SMI queue 134, method 300 may return to step 302.

At step 310, in response to the duration of the queued audio data being longer than an expected duration of an SMI in SMI queue 134, SMI handler 132 may execute the SMI.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   an audio controller communicatively coupled to the processor and configured to process audio data communicated from the processor to the audio controller for reproduction to a speaker communicatively coupled to the audio controller; and
   a non-transitory, computer-readable medium having instructions coded thereon that are configured to, when read and executed by the processor, cause the processor to carry out the following steps responsive to receipt of a system management interrupt or responsive to the system management interrupt having been scheduled and coming due for execution, wherein the system management interrupt is configured to trigger a system management mode in which the processor is configured to collect operational data from information handling resources of the information handling system and during which the processor is configured not to respond to other interrupts:
      determine whether the system management interrupt is expected to take more than a threshold duration to complete;
      determine whether audio data is actively streaming from the processor to the audio controller; and
      execute the system management interrupt in response to the system management interrupt being expected to take less than the threshold duration to complete or in response to audio data not actively streaming from the processor to the audio controller.

2. The information handling system of claim 1, wherein the instructions are further configured to schedule the system management interrupt for later completion in response to the system management interrupt being expected to take more than the threshold duration to complete and audio data actively streaming from the processor to the audio controller.

3. The information handling system of claim 1, wherein the instructions comprise a system management module embodied in a basic input/output system.

4. A method comprising:
   determining whether a system management interrupt is expected to take more than a threshold duration to complete, wherein the system management interrupt is configured to trigger a system management mode in which a processor of an information handling system is configured to collect operational data from information handling resources of the information handling system and during which the processor is configured not to respond to other interrupts;
   determining whether audio data is actively streaming from the processor to an audio controller communicatively coupled to the processor and configured to process the audio data for reproduction to a speaker communicatively coupled to the audio controller; and
   executing the system management interrupt in response to the system management interrupt being expected to take less than the threshold duration to complete or in response to audio data not actively streaming from the processor to the audio controller.

5. The method of claim 4, further comprising scheduling the system management interrupt for later completion in response to the system management interrupt being expected to take more than the threshold duration to complete and audio data actively streaming from the processor to the audio controller.

6. The method of claim 4, wherein the method is performed by system management module embodied in a basic input/output system of the information handling system.

7. An article of manufacture comprising:
   a non-transitory, computer-readable medium; and
   computer-executable instructions carried on the computer-readable medium, the instructions readable by a processor, the instructions, when read and executed, for causing the processor to:
      determine whether a system management interrupt is expected to take more than a threshold duration to complete, wherein the system management interrupt is configured to trigger a system management mode in which the processor is configured to collect operational data from information handling resources and during which the processor is configured not to respond to other interrupts;
      determine whether audio data is actively streaming to an audio controller configured to process the audio data for reproduction to a speaker communicatively coupled to the audio controller; and
      execute the system management interrupt in response to the system management interrupt being expected to take less than the threshold duration to complete or in response to audio data not actively streaming to the audio controller.

8. The article of claim 7, wherein the instructions are further configured to schedule the system management interrupt for later completion in response to the system management interrupt being expected to take more than the threshold duration to complete and audio data actively streaming from the processor to the audio controller.

9. The article of claim 7, wherein the instructions comprise a system management module embodied in a basic input/output system.

10. A method comprising:
responsive to an audio request being communicated to an audio driver, intercepting the audio request to determine a duration of audio data of the audio request;
determining if the duration of the audio data is longer than an expected duration of a system management interrupt, wherein the system management interrupt is configured to trigger a system management mode in which operational data is to be collected from information handling resources and during which other interrupts are not to be handled; and
executing the system management interrupt in response to the duration of the audio data being longer than the expected duration of the system management interrupt.

11. The method of claim 10, wherein the audio driver is associated with an audio controller external to an information handling system on which the audio driver is executing.

12. The method of claim 11, wherein the audio controller is coupled to the information handling system via a Universal Serial Bus (USB) interface.

13. The method of claim 10, wherein the intercepting is performed by a filter driver.

14. The information handling system of claim 1, wherein the threshold duration is 1 millisecond.

* * * * *